Sept. 18, 1934.  V. W. MOODY  1,973,880
INSULATING UNIT
Filed July 15, 1931   6 Sheets-Sheet 1
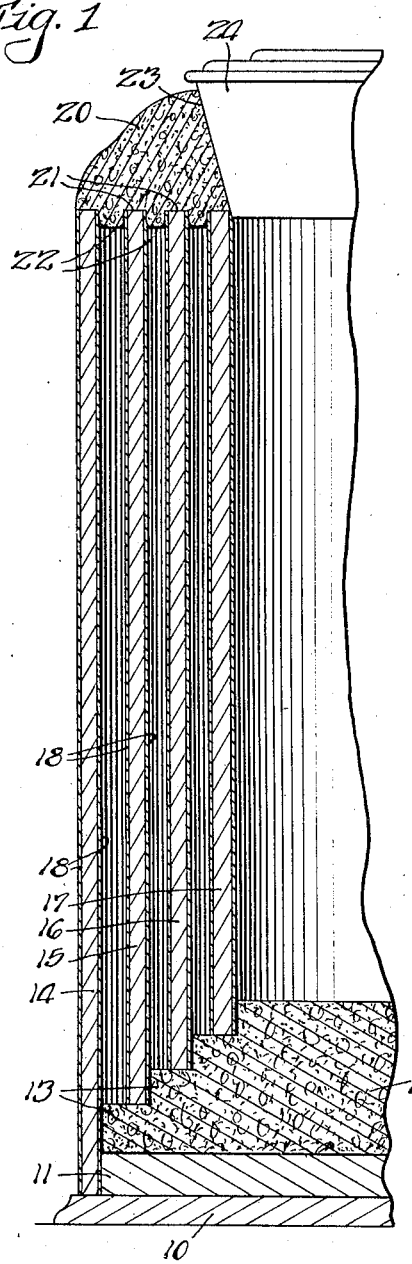
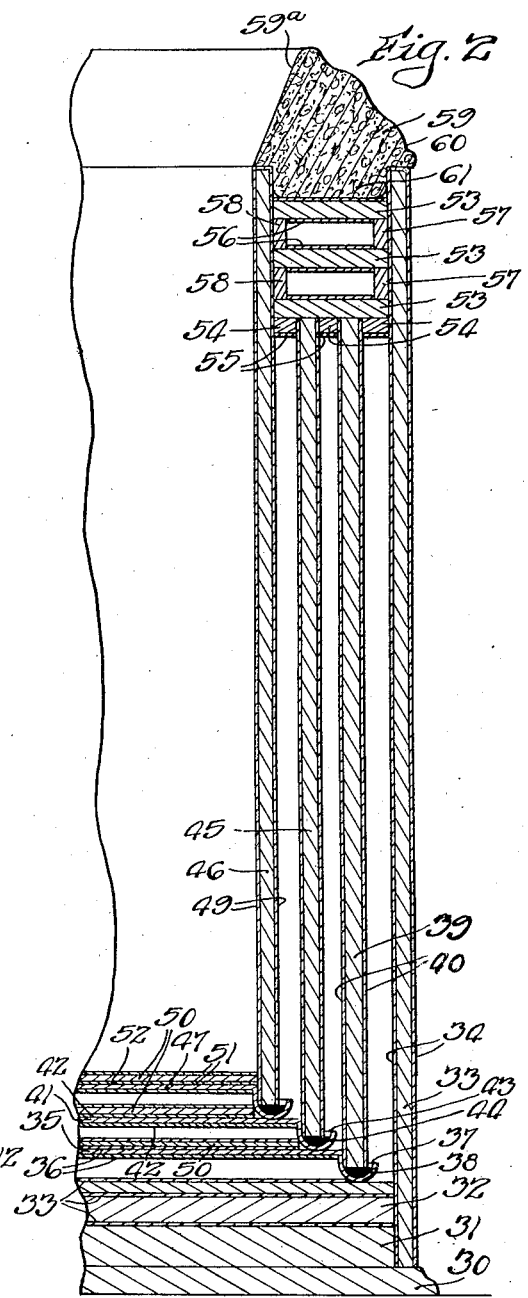
Inventor:
Virginius W. Moody Sept. 18, 1934.  V. W. MOODY  1,973,880
INSULATING UNIT
Filed July 15, 1931   6 Sheets-Sheet 2

Inventor:
Virginius W. Moody

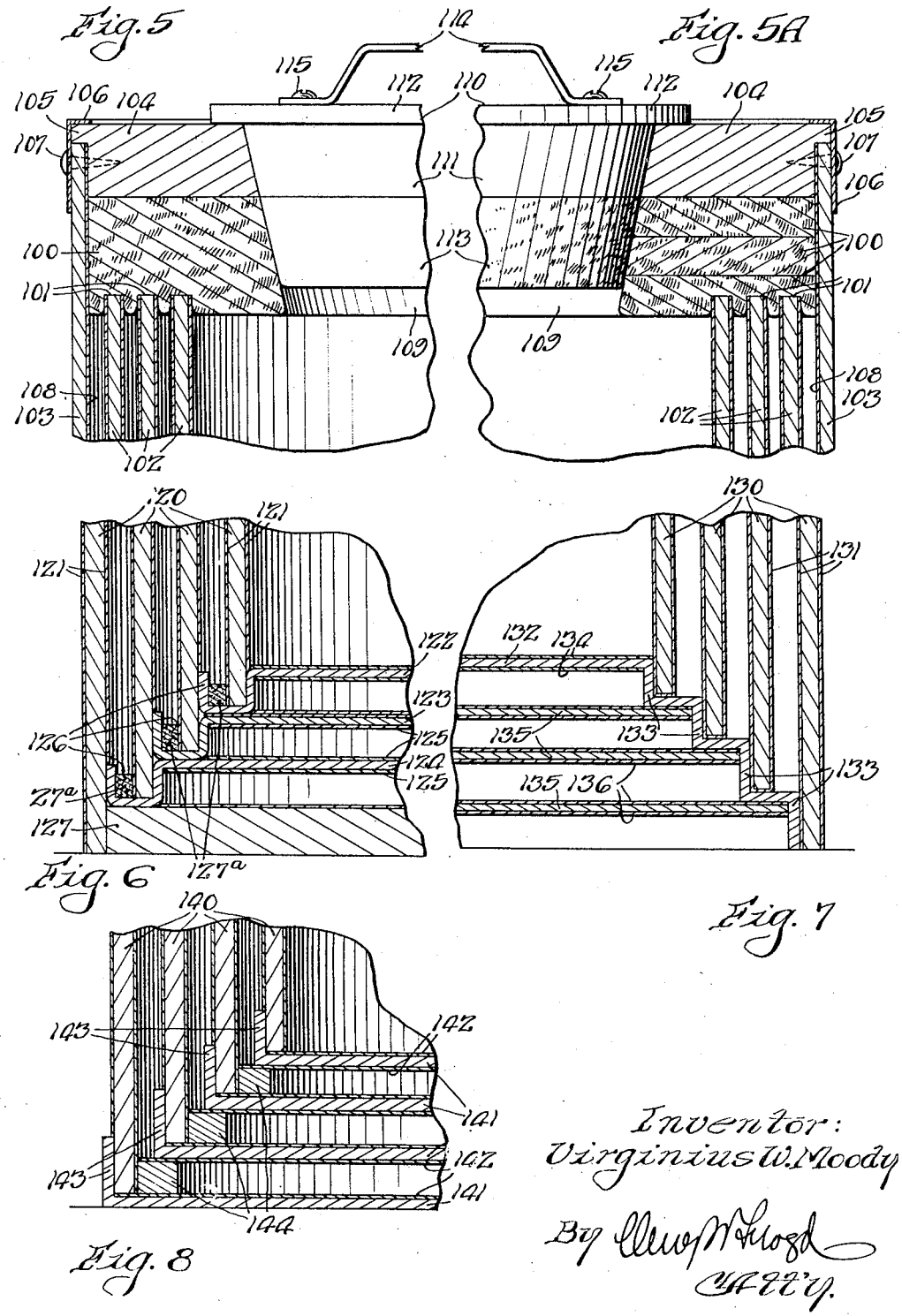

Sept. 18, 1934.  V. W. MOODY  1,973,880
INSULATING UNIT
Filed July 15, 1931  6 Sheets-Sheet 4
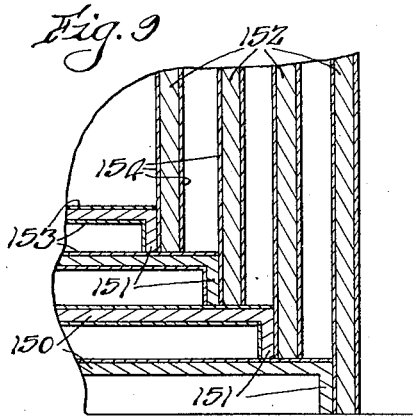
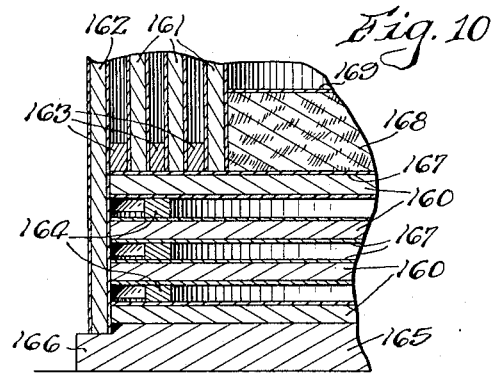
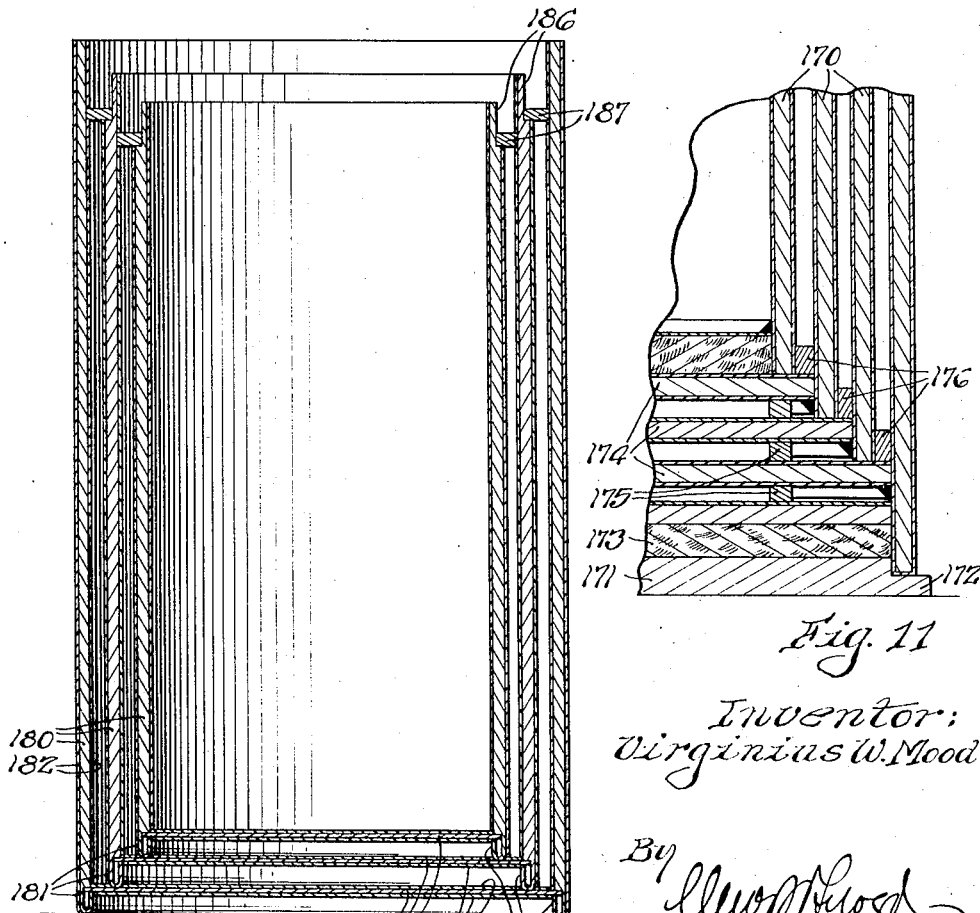
Inventor:
Virginius W. Moody

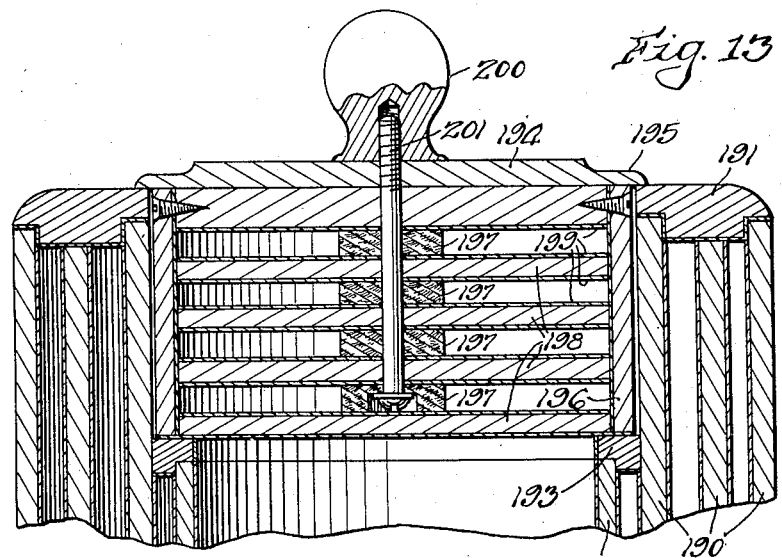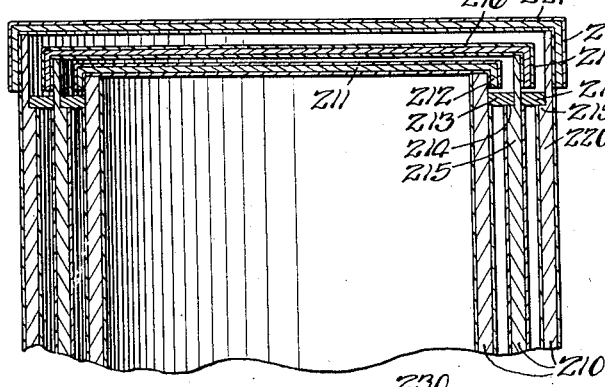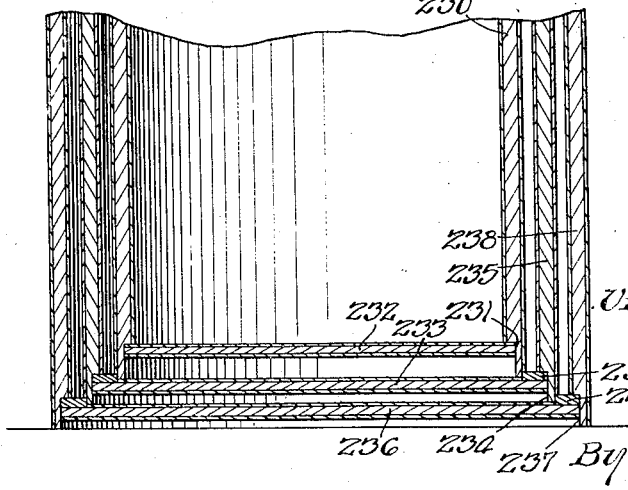

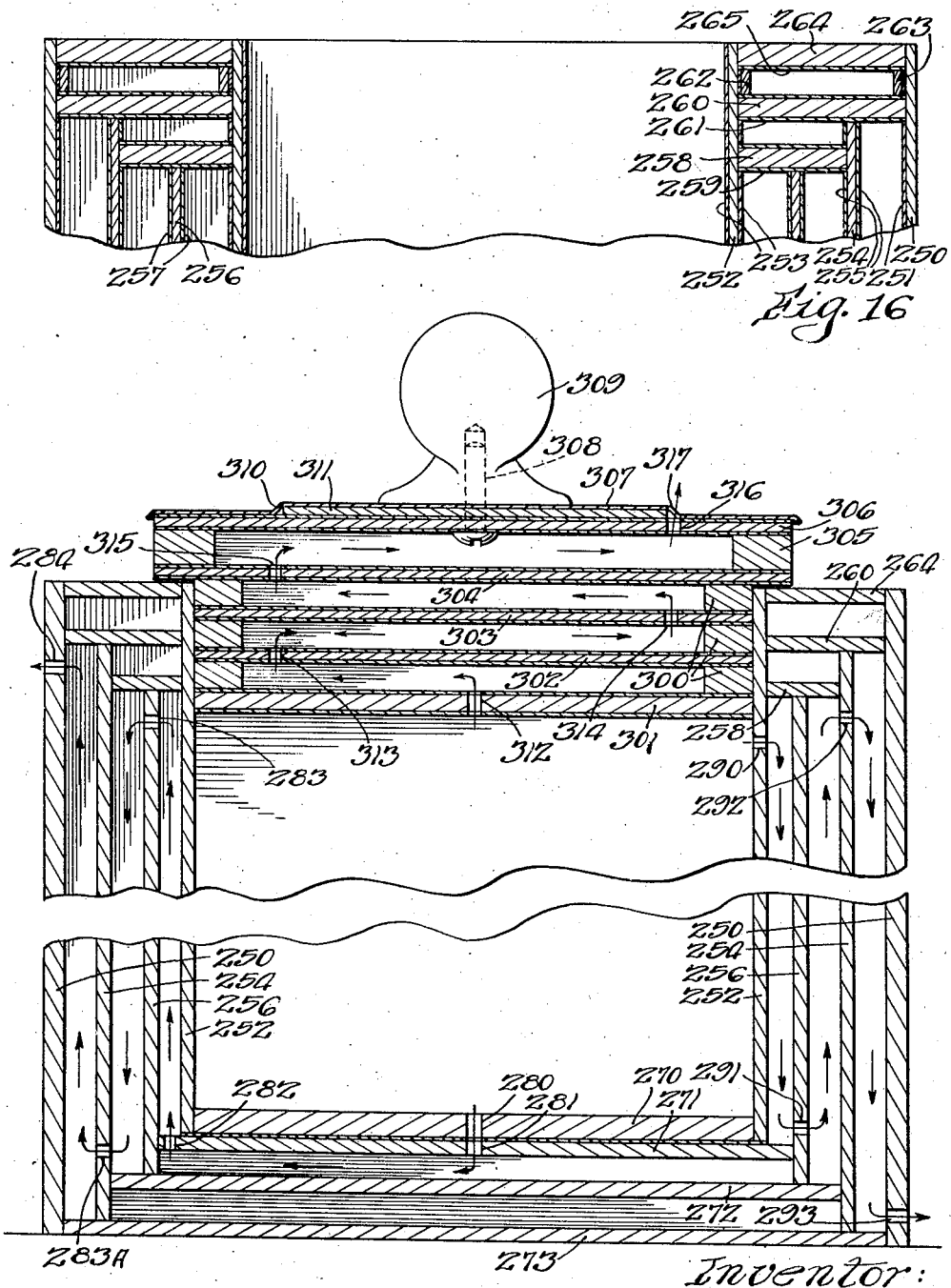

UNITED STATES PATENT OFFICE 1,973,880

INSULATING UNIT

Virginius W. Moody, Long Branch, N. J., assignor to Reynolds Research Corporation, New York, N. Y., a corporation of Delaware Application July 15, 1931, Serial No. 550,827

4 Claims. (Cl. 220—9)

The present invention relates to a container in which air spacing and bright faced metallic sheets are employed in the insulating structure thereof. While illustrated as applied to round containers, the invention is applicable to containers of all shapes and sizes.

Included in the objects of the invention are improved structures for refrigerating or heat protecting cabinets or vessels, and the adaption of such structures to the employment of air spaces and highly polished metallic surfaces to aid in increasing their insulating qualities.

Secondarily, the objects of the invention include improved mechanical and physical structures for containers.

A third object of the invention is the employment of polished foil surfaces or highly polished metallic surfaces as a part of the insulating measures employed in containers or the like.

A fourth object of the invention is to provide a container structure in which, when the container is closed by use of its lid or door, it will become virtually air tight in respect to its storage compartment and in each of the several cellular air spaces hereinafter described and illustrated in the accompanying drawings.

A fifth object of the invention is to provide vents in the various members of the container structures shown, the vents being designed for the purpose of controlling the circulation of gases therebetween or the storage of gases or fumes which may have preservative values superior to normal atmosphere.

Another object of the invention sharply contrasting it with hitherto known methods wherein bright metal surfaces are employed is to provide members on which the bright metal may be mounted and which thereafter become, within themselves, the structure of the contemplated insulated cabinet or device.

A further object of the invention is to provide an insulating container of a new and novel type which may comprise any number of air cells more than one and any number of cellular structural members greater than two.

These objects, and such other objects as may hereinafter appear, are obtained by the novel construction, unique arrangement, and improved combination of the several elements illustrated in the accompanying several sheets of drawings, illustrating a plurality of details of the invention.

Figure 1 is a fragmentary diametric section of one form of container embodying the subject matter of the invention;

Figure 2 is a similar section of a second form of container embodying such invention;

Figure 5 is a fragmentary diametric section of the top section of another container and of a closure therefor;

Figure 5A is a similar view of a like portion of a container, the construction being slightly different from that shown in Figure 5.

Figure 6 is a fragmentary diametric section of the bottom portion of a container embodying the invention.

Figure 7 is a similar view of a different form of container;

Figure 8 is a modified form of a container, the illustration being a fragmentary bottom section as are Figures 9, 10 and 11, each of which shows slightly different forms of structure;

Figure 12 is a diametric section of another container embodying the subject matter of the invention;

Figure 13 is a diametric section of the top portion of a container and closure therefor;

Figure 14 is a similar view of another container;

Figure 15 is a bottom view of a container embodying a slightly different form of the invention;

Figure 16 is a fragmentary diametric section of the top portion of another form of container; and Figure 17 is a diametric section of a container provided with ventilation both in the cover and in the container portions thereof.

Like reference characters are used to designate similar parts in the drawings and in the description of the several forms of the invention hereinafter given.

Figure 3:
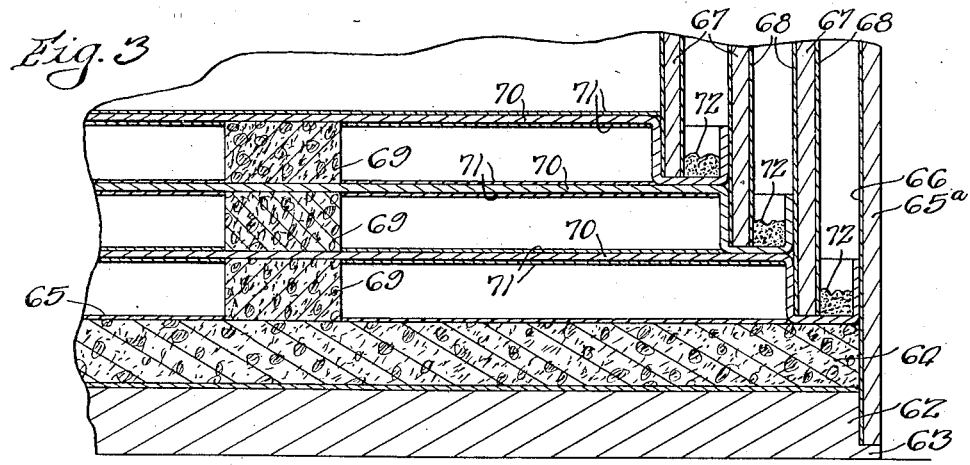
Figure 3 is a fragmentary section of a bottom portion of a container illustrative of the invention.

In the accompanying drawings, the views are generally fragmentary and demonstrate cylindrical construction, showing sufficient detail, however, to make clear the construction employed whether the ultimate container be cylindrical, square, rectangular, or otherwise shaped.

Figure 1 is a fragmentary vertical section of a storage jar, as for example a jar or drum for the storage or shipment of food, or the like, insulated from exterior temperatures. The structure possesses a further utility when it contains a refrigerant, as for example solidified carbon dioxide, chilled brine, ice, or other preservatives, for the use of which refrigerants it is well adapted.

In the device shown in Figure 1 there is a base 10 having a shouldered section 11. The shape of the base shown is cylindrical as is also the shape of the shoulder. Other shapes could be used. Disposed upon the shouldered section 11 of the base 10 is an insulating block 12 which may be of cork or other non-conductive material, and which has in it a plurality of concentrically arranged steps and shoulders 13, the bottom and side faces of which are normal one to another.

The base 10 may be of wood or other material of low conductivity and the shouldered internal member 12 may be secured thereto in any suitable manner, as by glue or other adhesive or by mechanical fastening means. The periphery of the member 12 may have the same diameter as that of the base member 10 at its shouldered portion 11.

Arranged upon the horizontal faces of the base and of the member 12, are concentric cylinders 14, 15, 16, and 17. Such cylinders are of material of low heat conductivity, but of sufficient physical strength to retain their shape and to provide a sturdy finished unit. Each of such cylinders at each side has a very thin metallic material 18, generally designated foil, secured thereto by suitable adhesive or in any other suitable manner.

Both surfaces of each of the cylindrical members are of highly polished metal. The metal foil 18 may extend the full length of the cylinder or it may terminate at the point of contact with the base member heretofore being described and the top member shortly to be described. At the joints, either with respect to the top member to be described, or with the base member, an adhesive or adhesive bath is employed.

At the top of the device, an annular collar 20 is provided. Said collar 20 is provided with internal and external grooves 21 and 22, respectively. The internal grooves 21 have two faces and a bottom. The external groove 22 has a top face and an internal face.

Into these grooves 21 and 22 are adapted to be fitted the several cylinders 14, 15, 16, and 17, and the ends thereof are secured in position by an adhesive or adhesive bath.

The foil 18 may extend to the very top of the cylinders, or it may terminate at the point of contact with the annular members just as it does in respect to the bottom of the cylinders. As previously indicated, said annular member 20 may comprise wood, or any material possessing low heat conductivity. The internal wall 23 thereof may be obliquely disposed or inwardly tapered (truncated coniform) to provide a contacting surface for a sliding or slip cover 24.

The walls of said sliding or slip cover converge are at the same angle as the internal wall 23 of said collar member 20. The cap 24 should be of materials of low heat conductivity and should fit snugly within the annular member 20.

By the means described, a many walled cylinder is obtained. Between contiguous walls thereof an air space is had. The walls surrounding said air spaces, and the internal and external walls of the device are all highly polished metal, thus providing a plurality of reflecting walls so effective to prevent heat transfer.

A second form which the invention may take is shown in Figure 2. In such device, there is a base 30 having a projecting or flanged portion and a shouldered section 31. A cylindrical disc 32 is disposed above and upon said base 30. Said disc 32 may be integral therewith but preferably is of a different material secured to the base 30 and possessing a lesser ability to conduct heat. The periphery of the disc 32 is coincident with the periphery of the shoulder 31.

The top surface (and bottom surface when desired) of said disc 32 is adapted to be covered by a bright metallic face adhesively or otherwise suitably applied thereto.

At the outside of said vessel, there is a cylindrical member or tubular member 33 of material of low heat conductivity. Both sides of such cylinder 33 are covered with bright metallic foil 34 adhesively applied thereto. Said cylinder 33 surrounds shoulder 31 and disc 32 and rests on base 30.

Diametrically disposed within said cylinder 33 and spaced from the foil covered disc 32 of the apparatus except at its edges is a disc of paper 35, light but sturdy, both sides of which are covered with a thin metallic foil or metal 36 adhesively applied thereto.

At its periphery disc 35 has flanges or flanged troughs 37 into which an adhesive puddle 38 is adapted to be formed. Therein and spaced from the external wall member 33 and from the bottom disc 32 is a second cylindrical member 39 concentric with the outer member 33 but of less height. Said cylindrical member 39 is foil covered (40) externally and internally, and adjacent its lower end but spaced therefrom is a second disc 41, coated with foil 42 on both sides and adhesively secured thereto, the disc 41 being like disc 35 but of less diameter.

Disc 41 has a peripheral trough 43 frilled with an adhesive puddle 44. Seated with said puddle 44 is a cylinder 45 concentric with cylinders 38 44 and 39. The container may be further built up with similar discs and cylinders.

The innermost cylinder 46 resting in disc 47 rises to the same horizontal top plane as outside member 33, while the intermediate cylindrical members 45 and 39, both of which reach the same horizontal plane, are of less height than inner member 46 and outer member 33.

For want of better descriptive term, the discs having peripheral troughs, like disc 47, may be considered as inverted pie pans with roller troughs to receive adhesive puddles.

The internal member 46 is coated on both sides with thin metallic sheet 49 adhesively applied thereto. A disc 50 coated with foil 51 is arranged internally of member 46 and spaced from disc 47. An adhesive joint 52 is adapted to secure said disc 50 in position. Discs 41 and 35 may have a similar supplementary disc applied thereto in the same nature as disc 50.

At the top of the device and intermediate the outer and inner tubes 33 and 46, spacer elements are used. These comprise annular members 53. The lowermost member 53 may have on its bottom surface three concentric ring members 54 or a plurality of small blocks to provide spacers between the outer member 33, the next adjacent member 39, the member 45, and between member 45 and the internal member 46. When the spacer elements 54 are annular and concentric, the under surface thereof may be coated with a thin sheet of foil 55 adhesively applied thereto.

The upper and lower surfaces of said annular members 53 are also covered with a thin sheet of metal 56 adhesively applied thereto. Above the lowermost member 53 are two additional annular members or spacer elements 53. Members 53 are separated one from another by ring members 57 and 58, the former secured to outer member 33 and the latter to inner member 46.

Thus the surfaces of the annular spacing members provide boundaries having a thin sheet of reflective metal for air spaces, as do each of the tubular vertical members 33, 39, 45 and 46. Air spaces are also provided at the bottom of the device between the several discs heretofore described.

By the arrangement shown, an annular seat is provided between members 33 and 46 for a collar 59 which collar may be of wood, formica, or other heat insulatory, or material of low heat conductivity. Said collar has a body the inner surface of which has a convergent wall 59a and the outer surface 60 of which may be arranged in a regular or ornamental fashion. The lower portion of said collar 59 comprises an extension 61 adapted to be inserted between the outer member 33 and the inner cylinder 46 to rest upon the top spacing member 53 therebetween. Said collar 59 is secured in place by the use of an adhesive cement or other adhesive, or by other means.

Any suitable top (not shown) may be applied to a container of the construction described and illustrated, the usual cover being of the friction type slidable into position upon the converging wall 59a of said annular collar 59.

In Figure 3, a very simple structure is illustrated. The lower portion of the container includes a wooden or other bottom member comprising a body 62 terminating in a lip 63 adjacent to its under surface. Disposed upon said wooden bottom 62 and concentric with the body thereof is a plug 64 of insulatory material, such as insulite, or other material which is not conducive to heat conduction.

The upper surface of the plug 64 is covered by a thin sheet of metal 65, say, of foil thickness, adhesively applied thereto. Extending around the wood bottom 62 except the lip portion 63 thereof, and about said plug for the container, which member may be, if desired, provided with a foil coating 66 upon its internal surface or upon both sides when preferred.

Said cylindrical member 65a is adapted to rest upon the lip 63 of said wood base 62 and to be secured in position thereon in any suitable manner. Said cylinder 65a may be sealed against said insulating plug 64 by adhesive or otherwise. Concentrically arranged within said external cylinder 65a, and regularly spaced therefrom, are a number of other cylinders 67 having a core of heat resisting material or non-conducting material, both surfaces of which are coated with a thin sheet of metal 68 adhesively applied thereto. Upon the plug 64 is a spacer 69. Thereabove is a disc 70. Each disc is like an inverted pan. The periphery of the pan is a U-shaped rim, the outer edge of which engages the inner wall of the outermost cylinder 65a. The inner wall of spacer 67 engages the inner leg of the U-shaped roll, the bottom of the cylinder 67 resting in the U-shaped roll. An adhesive puddle may be disposed in the inverted U-trough at the edge of the disc 70. Above the lowermost disc 70 is another spacer 69 and a second disc 70 of a diameter corresponding to the internal periphery of the next innermost cylinder 67. The walls of the container may be thus built up, four walls being shown, three of cylinders 67 and one of cylinder 65. Each cylinder 67 has foil faces as hereinabove noted. Each disc 70 is supplied with foil faces 71. Spacer 69 is of non-conducting material and comprises no more volume than is necessary for the required strength of the container.

Adhesive pools 72 of suitable depth are arranged in the rolled rims of discs 70 not filled by cylinders 67. Thus the air space between said cylindrical members is closed and concurrently an air space is provided between each of cylindrical discs and the lowermost cylindrical disc and the insulation plug 64.

Such a device as described and illustrated has air spaces between its several cylindrical wall members and its several circular bottom members, each of which spaces is faced by a thin sheet of highly reflective metal.

Figures 4, 4A:
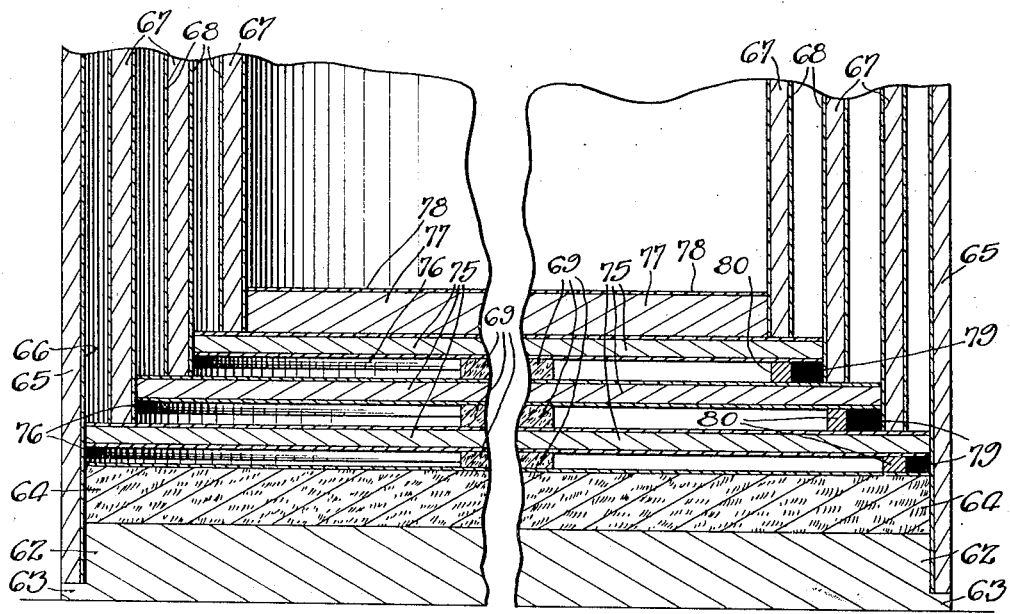
Figure 4 is a similar view of another type of container.
Figure 4A is another view of a similar portion of a container.

In Figure 4, another method of forming the bottom of a cylindrical container having plural walls is shown. In many ways, the container illustrated is like the form of container shown in Figure 3. There is a base 62 having a lip or flange 63. Thereon is a plug 64 and the upper surface of which may be coated with metal adhesively applied thereto. The cylindrical member 65 has no external coat of foil as shown although such a coating may be applied thereto. The outer cylinder 65 is illustrated as internally coated with a thin sheet of metal 68 adhesively applied by adhesive or the like.

Discs 75 are shown as secured to the cylindrical members 65 and 67 merely by an adhesive joint, the strength of the joint providing the structural strength necessary in the container illustrated. The container is built up by securing a cylindrical disc to a cylinder and fabricating the addition of cylinders and discs which are secured in selected position by asphaltic cement forming joints 76. The discs 75 extend beyond the periphery of the cylinders 67, the lowermost to the internal wall of cylinder 65, and the others to the internal wall of the complemental cylinder 67. All cylinders 67 are thus made to rest upon discs 75 with a joint 76 at the underside and periphery of the discs 75. A plug of insulite 77 or other insulating material is seated within the innermost cylinder 67 to rest upon topmost disc 75.

By the use of spacers 69, air spaces are had intermediate discs 75 just as in Figure 3 where the spacers are disposed between discs 70. The upper surface or both surfaces of plug 77 may be coated with a metal sheet 78 adhesively applied thereto. In such a device, the metallic lining is unbroken throughout the side walls and bottoms. In such a device, the metallic lining is unbroken throughout by traversing the side walls of each cylinder. Its bottom disc fitting is in an unbroken line. For these reasons, its properties of conduction tend to distribute heat uniformly in the bottom and side wall areas.

A similar result is obtained by the structure shown in Figure 4A, these being the difference that pools are substituted for adhesive joints. An adhesive pool 79 is arranged at the inside of each cylindrical member 67 such pool being defined by the inner wall of member 67 at one side and by an annular washer 80, which also serves as a spacing element for the discs 75. The top and bottom of the pool are defined by the contiguous faces 76 of discs 75. The washer 80 may be of any suitable insulatory material or material of low heat conductivity. In respect to the outer member 65, the pool is defined by a member 67, the member 65, plug 64, and disc 75. As to the top spacer, there is a plug 77 as in the form of the device shown in the left hand side of the figure.

In Figures 5 and 5A, a top fitting for a cylindrical container is illustrated in two forms. Said fitting comprises, Figure 5, an annular member 100 having an integral construction of insulite or comprises, Figure 5A a plurality of layers of insulite or other poor conductors of heat. The bottom portion of the member 100 or the bottom lamination thereof has a plurality of concentric grooves 101. The end of foil covered concentrically arranged tubes 102 are adapted to be seated in said grooves 101.

The external wall of said insulatory member 100 is adapted to be seated within an outer cylindrical member 103.

Above said insulatory member 100 there is a wood fitting 104 which has a lip 105, the lip projecting outwardly the thickness of the outer cylindrical member 103 so that a smooth exterior surface is provided for the fitting 104 and cylinder 103. Any suitable means may be used to connect the wooden member 104 with the insulite material 100 and to secure the outer shell 103 to the wooden member 104. A split hoop 106 may be employed such hoop member 106 being adapted to be secured by a fastening member 107 extending through the hoop 106, the cylinder 103, and into the wooden block 104 as shown.

Foil 108 on the inner wall of the outer cylindrical member 103 may extend upwardly to the insulite annulus 100 and may terminate at the lower edge thereof or it may be extended to the top thereof.

The laminations or integral insulite base 100 and the wooden member 104 associated therewith are each provided with a central aperture with a single converging wall 109 tapering as the bottom is approached. The wall of the two members are in alignment, and are adapted to be closed by a plug 110, the body 111 of which is wood or other material having flanges 112 to extend over the opening in the wooden top 104 of the container. The under portion 113 of the plug 110 is of insulite in layer or lamination, or integral, as preferred. It may be of cellular laminations as shown in Figure 13. A handle 114 of suitable configuration is adapted to be secured to the wooden body 111 by screws 115 of other suitable fastening means descending thereinto as shown.

In Figure 6 there is shown a fragmentary section of the bottom of a cylindrical vessel comprising another form of the invention. Cylinders 120 with foil coating 121 on each side are employed. A plurality of discs 122, 123 and 124 moulded of pulp or other material and then coated on both sides with foil 125 are supplied. In each disc, there is a central circular portion, which terminates in a depending short wall normal to the central section. An annular section is articulated therefrom to form a narrow section parallel with the central portion of the disc. At the periphery of the annular section, there is an upturned lip. A well 126 thus is provided at each of the discs 122, 123, and 124 to receive at its internal wall an inner cylinder 120 and at its outer wall another cylinder 120. An adhesive pool 127a is provided intermediate the outer wall of the disc and the cylinder 120 seated therein. The lip of the disc or its peripheral upright wall may be of sufficient area to provide for a joinder of asphalt with the outer cylinder 120 associated therewith. In the form of device shown, an additional bottom disc 127 of insulite or other material may be provided, when desired.

In the form of the invention shown in Figure 6, associated with two cylinders 120, the well 127a provides a spacer between contiguous discs. Only the external cylinder 120 is associated with only one of the bottom discs. Each of discs 122, 123 and 124 may be foil coated. Such coating is indicated as 125.

In Figure 7, another form of a bottom is illustrated. The vertical walls of the vessel are shells 130 of the usual concentrically arranged cylinders having foil coating 131 on each side thereof. The bottom is closed by a single disc 132 possessing foil sheetings 134 on each side thereof and having concentrically arranged step 133. Each cylinder or shell 130 is adapted to engage against the vertical section of the disc 132 to form a step 133. Adhesive is supplied to secure the cylinders 130 in position on disc 132.

The bottom of the device may be arranged as of air spaces by the use of circular sheets 135 having foil coatings 136 thereon. Each of sheets 135 is arranged to rest on the under side of a step 133 and is arranged to be secured in position by suitable adhesive. Each disc 135, as the outer one thereof is reached is larger than the next preceding disc 135.

A wooden base or an insulite base, neither of which is shown, may be added to this form of the invention, as it may also in respect to the form shown in Figure 6.

In Figure 8, a bottom structure of a different type is illustrated. The cylinders 140, instead of being closed primarily at their internal walls are sealed by the transverse discs 141 upon their external walls which may be foil covered. Such foil is indicated by the numeral 142. Each cylinder 140 has a slip cover 141 moulded or otherwise formed, which has a flange 143 which is adapted to slip over the end of a cylinder 140 and be secured thereon by adhesive. There may be disposed between each succeeding concentric disc 141 a spacing element 144 as illustrated, in the form of annulus of a material of low heat conductivity. Adhesive cement maintains the washers 144 in position against the internal wall of cylinders 140.

A substantial bottom of wood or the like (not shown) may be attached to the fabricated container, if desired. The flanges 143 of the slip cover 141 are adapted to snugly fit upon the shell 140 and be sealed against air leakage by adhesive.

In Figure 9, a reverse of the structure shown in Figure 8 is illustrated. In such latter form of the invention, there are flanged discs 150, the flanges being designated 151 and being of a diameter to fit within the cylinders 152. The discs 150 may have foil coatings 153 and the walls of cylinders 152 may be coated with foil 154. The discs 150 are inserted into cylinders 152 in reversed position and are secured therein by suitable adhesive.

As shown, the outer disc is secured to the outer cylinder and supports the next innermost cylinder and disc, so that except for the outer cylinder, the cylinders are adapted to rest upon a disc. The innermost cylinder is provided with a disc upon which no cylinder rests. Air space is thus had between the bottom laminations and the vertical walls, each of the air spaces being lined with a highly reflective thin sheet of metal.

Further details of the invention are shown in Figures 10 and 11. In the structure shown in Figure 10, there are discs 160 of uniform size, and cylinders 161, except the outer cylinder 162, of uniform length. Spacing elements 163 between the cylinders 161 and cylinders 162 are of uniform width and depth. Such spacers 163 may be in the form of concentric annuli, or blocks of insulation material. Spacing elements 164 are provided between the discs 160. These are of uniform depth, and may be in the form of annuli or in blocks, or short strips.

A suitable wood bottom 165 is provided, there being a flange section 166 upon which the outer cylinder 162 is disposed. The bottom of the container is built up from the bottom 165 by the use of the discs 160, foil covered on both sides, spaced apart by a plurality of spacers 164, the number of base discs 160 being a matter of selection. The foil is indicated by the numeral 167. A false bottom 168 covered with foil 169 on its top surface may be disposed upon the topmost disc 160.

The cylinders 161 are arranged concentrically with annular air spaces therebetween, the air spaces being lined with reflective metal. The whole is joined together by a suitable asphaltic cement used in no larger quantity than is necessary to secure firm joinder.

In Figure 11, another form of the invention is shown, similar to that illustrated in Figure 10. Cylinders 170 are of different diameters, and the lengths thereof vary. A wooden base 171 with a flange 172 to receive the outer cylinder 170 is provided. There may be a disc 173 of cork or other insulatory material upon said bottom 171. Thereabove, a plurality of discs 174 of different diameters suitably spaced apart are held in spaced relation by suitable annular washers or strips 175 or the like. The cylinders or shells 170 extend downwardly to engage and rest upon the discs 174. The margins of the discs 174 extend beyond the periphery of the cylinder 170 supported thereby, forming lips to receive annuli 176 held in position upon the disc external to the wall of cylinder 170. Cementitious or asphaltic cement may be employed in the usual manner to join the various parts together.

By the structure illustrated, a very secure container is had from a plurality of cylinders and discs. The innermost cylinder 170 may have an insulatory core 177 resting upon the topmost disc 174.

Another type of construction embodying the invention is illustrated in Figure 12. Cylinders 180 terminate in an undercut end 181 which is adapted to be crimped inwardly. Foil 182 is provided on each surface of the cylinder 180. Disposed within the undercut part 181 of the shell 180 is a disc 183 having the usual foil coatings 184. The material of the shell 180 is crimped thereover as shown at 185. The several cylinders 180 are arranged concentrically one with another. Adjacent the top 186 of the inner cylinder 180 there is undercut to receive an annular washer 187 secured in position by the usual adhesive. The outer cylinder 180 is free from such undercutting. Such structure is readily formed. Additional spacing elements may be used but such additional elements are optional.

In Figure 13, one form of structure for a top is illustrated. A plurality of shells 190 are held together in the usual way by an annular collar member 191. Within the innermost of the shells held by member 191 is another shell 192, the top end of which terminates in an annular shouldered washer 193 providing a shoulder for a closure or slip top.

Within the aperture formed in the wooden collar 191, and extending downwardly into the cylinder thus formed approximately to the top of the washer 193 whereby the innermost shell is held in position, is lid or plug which comprises a wooden block 194 having a flange 195. A cylindrical shell 196 is secured about the body 194 and abuts the flange 195 from beneath, spacer elements 197 at the center, and discs 198 having foil coatings 199 on each side thereof.

Attached to the wooden block 194 and extending upwardly therefrom is a handle 200. The device may be assembled by the use of a bolt 201 extending centrally through the several spacer elements 197 except the bottom disc, through the wooden top 194 upwardly into the handle 200. It is desirable to countersink the bolt 201 in the lower spacer 197, and to provide at the bottom of the cover a disc 198 without central aperture which extends from edge to edge of the shell 196 providing a surface of unbroken metal foil.

In Figure 14, an inexpensive way of providing an insulatory closure for a cylindrical container of a plurality of shells 210 is shown. The innermost shell 210 is covered with a slip cover 211 having a short flanged side 212. At the edge of the flange, there is an annular washer 213 which rests against the inner shell 210, and upon a shoulder 214 in the next adjacent shell 215. Shell 215 extends above the level of the innermost shell 210, the material being skived above the shoulder 214.

Thereover is another slip cover 216, the flange 217 of which extends downwardly upon a side thereof, and terminates adjacent another annular spacing washer 218 between the external periphery of said inner shell 210 to the shoulder 219 upon an outer shell 220, the upper portion of which outer shell 220 is skived or cut away to provide such shoulder. Over the outer shell 220 is also a slip cover 221 having a depending flange 222 extending thereover and downwardly upon the side of shell 220 to substantially the horizontal plane of the shoulder 219.

Such structure comprises an inner shell, an intermediate shell, an outer shell, the intermediate and the outer shells having shouldered ends, and three slip covers which may be attached independently or which may be connected together in any suitable way for joint manipulation.

Each shell and each slip cover has a body and coatings on each side thereof of foil. Adhesive cement is applied to maintain the foil in position and to maintain the spacing washers in correct position.

In Figure 15, a bottom is illustrated. It is formed with undercut cylinders. The inner shell 230 has an internal peripheral groove or undercut section 231. A disc 232 is seated therein. The bottom of member 230 is sealed by such disc. Upon its bottom edge, said member 230 rests upon another disc 233 which is adapted to extend outwardly into a groove 234 in an intermediate cylinder 235, said disc 234 being secured at its periphery in the grooved portion 234 of said intermediate member 235. At the bottom edge of the intermediate member 235, an outer disc 236 is secured. Said outer disc 236 extends beyond the periphery of said intermediate member 235 and fits into the groove 237 in an external shell 238. Said outer member 238 is secured thereto by adhesive applied at the periphery of said outermost disc.

When desired annular washers 239 and 240 may be disposed between the several cylinders as shown, adding strength to the structure and facilitating rapid assembly.

Still another form of the invention is shown in Figure 16. In said figure, which is a diametric section of the top of a container, there is an outside cylinder 250 and an inside cylinder 252.

The outside cylinder may have foil coatings 251 and the inside cylinder, foil coatings 253. The tops of said cylinder 250 and 252 are in the same horizontal plane. Intermediate said cylinders 250 and 252 are two other cylinders, cylinder 254 having a foil coating 255 and cylinder 256 having a foil coating 257. The cylinder 256 is shorter than the cylinder 254.

Intermediate the innermost cylinder 252 and cylinder 255 and resting upon the top of the shorter cylinder is an annulus 258 which optionally may have a foil coating 259. Resting upon the top of said taller internal cylinder 255 is an annulus 260 with foil coating 261 and extending from the cylinder 250 to 252. Thereabove are annular washers 262 and 263 and above said washers is another annulus 264 like annulus 260, which latter annulus may be foil coated 265 and provides the horizontal top surface of the device. Suitable adhesive is applied to secure the various annuli and cylinders together, and to secure the washers 262 and 263 in place.

The device illustrated in Figure 17 is like that shown in Figure 16 except that a bottom portion is shown and the container is provided with ventilation. Said bottom section is formed from a central disc 270 which rests between the walls of the cylinder 252. Therebeneath, and secured thereto, is another disc 271, larger in diameter, which extends to the walls of the shorter cylinder 256. Beneath the shorter cylinder 256 is a third disc 272 upon which the bottom edge of the shorter cylinder 256 rests, the periphery of said disc 272 engaging the cylinder 254.

Said last mentioned cylinder 254 rests upon a bottom disc 273 which extends to the external walls of the outer cylinder 250. Each of said several discs is covered with a foil coating, it being thought unnecessary to indicate by the use of numerals the foil coating in this particular view.

Through the center disc 270 and the disc 271 therebeneath, is a continuous aperture 280 and 281. Said apertures open from the center of a container into the air space intermediate disc 271 and disc 272. The disc 271 has an aperture 282 therein which opens into the annular air space between the cylinders 252 and 256. The latter, 256, has an opening 283 therethrough into the surrounding concentric air space between cylinders 254 and 256. There is an opening 283A in the cylinder 254 into the most external air space left between cylinder 250 and 254. From the outer cylinder 250 there is an aperture 284 opening into the atmosphere. Thus, it will be seen that gas liberated under pressure in the storage compartment surrounded by cylinder 252 is permeated to reach the outer atmosphere through a predetermined tortuous passage, wherein the beneficent qualities or carbon gases or fumes may be utilized as hereinafter discussed.

At the other side of Figure 17, that is, the right hand side, a different series of apertures is shown. In such series, there is an aperture 290 in the internal cylinder 252, an aperture 291 in the shorter cylinder 256, an aperture 292 in the next outermost cylinder 254, and an aperture 293 in the external cylinder 250.

By arrangement of apertures shown, a tortuous or indirect path from the interior of a container to the outside atmosphere is arranged. The purpose of having such a pathway from the interior of the container is to permit of the escape of the gases released by a refrigerant, such as solidified carbon dioxide, or of fumes and to utilize the insulating value of such gases or fumes as may have more potent heat insulation than normal atmosphere. It also prevents an excessive internal pressure by reason of gas or fumes generated therein, they being permitted to escape by such paths as those just described.

The apertures are of such size that the insulatory qualities of the container are not adversely affected. Tortuous paths by which gas travelling outwardly through the container or other vessel must proceed is a retardant against major changes in the temperature of the contents of a container.

Associated with the form of container shown in Figure 17 is a closure which comprises a plurality of annular washers 300 of the same diameter. Said washers 300 are used to space a bottom disc 301 which is the bottom external member of the closure, and discs 302, 303 and 304. The latter disc 304 is of greater diameter than discs 301, 302 and 303, and disposed thereupon is a larger annular washer 305. At the top of said annular washer 305 is another disc 306, and thereover is a covering material 307 of any suitable character. Through the top disc 306 there extends a bolt 308 which passes through the cover member 307 into a handle 309.

Intermediate the cover member 307 and the topmost disc 306 at a central portion and beneath the offset section 310 of said cover member 307 there may be an additional disc or washer 311 to give to the cover greater rigidity.

Each of the discs may be foil covered, and the same may be true of each of the washers. The lowermost disc 301 has an aperture 312 therethrough, and there are apertures 313, 314, 315 and 316 in the discs 302, 303, 394 and 306.

Thus, gas as generated within a container may be passed outwardly through the closure by passing through aperture 312, aperture 313, aperture 314, aperture 315, aperture 316 and aperture 317. By the arrangement of apertures shown, a tortuous path is provided for such gas from an otherwise air tight container so that there is a relatively slight temperature disturbance in the contents of the air space intermediate the various discs comprising the closure.

By providing a series of apertures in the several members of the walls of the container or in its closure, the container may be designed to be otherwise air tight and thereby minimize the waste of a refrigerating agent, and where solid carbon dioxide is used as a refrigerating agent the gases or fumes, which are of a more heat resisting nature than normal atmosphere, are purposely passed outwardly of the container through a tortuous path or paths and are made to serve as an improved and additional insulation, at the same time safeguarding against any tendency on the part of a container to explode or burst from an excessive gas pressure due to the generation of fumes, or to the evaporation of solidified refrigerants such as carbon dioxide. Likewise, no dangerous vacuum may be created in the container.

What I claim is new and desire to secure by Letters Patent of the United States is:

1. A heat insulating container having walls comprising a plurality of spaced apart insulating members, and a bottom comprising a number of spaced apart insulating members and adhesive material, said bottom insulating members each having thereabout a gutter, the lower edge of each of said first mentioned insulating members resting within the gutters about one of said bottom insulating members and said adhesive material being in said gutters and about the edges of said first mentioned insulating members for sealing and fastening their edges therein.

2. A heat insulating container having walls comprising a plurality of insulating members of varied dimensions and adapted to be spaced apart concentrically and a bottom comprising a number of spaced apart insulating members of varied diameters arranged to grade from the smallest at the top to the largest below, each said bottom member having a gutter therearound, the lower edge of each of said first mentioned insulating members resting within one of said gutters, there being adhesive material within said gutters and about the edges of said first mentioned insulating members therein for sealing and adhesively holding their edges therein.

3. A heat insulating container having a bottom comprising a plurality of spaced apart insulating members of varied sizes arranged in order with the smallest above and the largest below, each said insulating member having a gutter closely therearound, a wall comprising a plurality of insulating members of diameters corresponding to the diameters of the gutters about said bottom members arranged concentrically with the lower edges thereof resting within one of said gutters, there being adhesive material within said gutters and about the edges of said wall members for sealing and adhesively holding their edges therein, a grooved closure sealing the spaces between said wall insulating members at the top thereof and holding the tops of said wall members in concentric arrangement, and a removable cover for said container comprising a plurality of spaced apart insulating members.

4. A heat insulating container having a bottom comprising a plurality of spaced apart insulating members of varied sizes arranged in order with the smallest above and the largest below, each said insulating member having a gutter closely therearound, a wall comprising a plurality of spaced apart insulating members of varied sizes arranged in order with the smallest above and the largest below, each said insulating member having a gutter close therearound, a wall comprising a plurality of insulating members of diameters corresponding to the diameters of the gutters about said bottom members arranged concentrically with the lower edges thereof resting within one of said gutters, there being adhesive material within said gutters and about the edges of said wall members for sealing and adhesively holding their edges therein, a grooved closure member fitting upon the tops of said wall members and receiving said wall members into the grooves therein, said closure member having a truncatedly coniform opening into said container, and a truncatedly coniform removable cover member fitting closely into said opening.

VIRGINIUS W. MOODY.